May 14, 1929. W. D. COLLIER 1,712,551
RECEPTACLE CLOSURE
Filed March 19, 1928
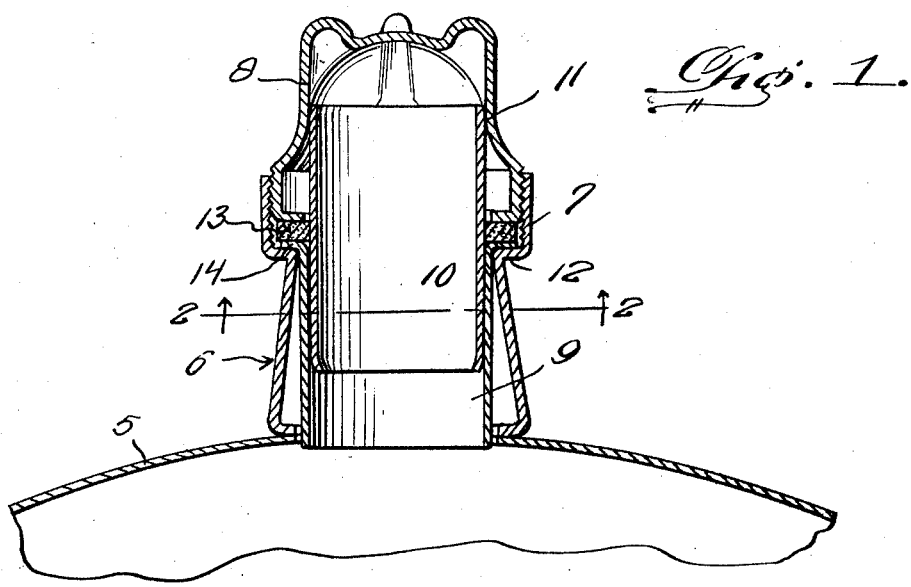
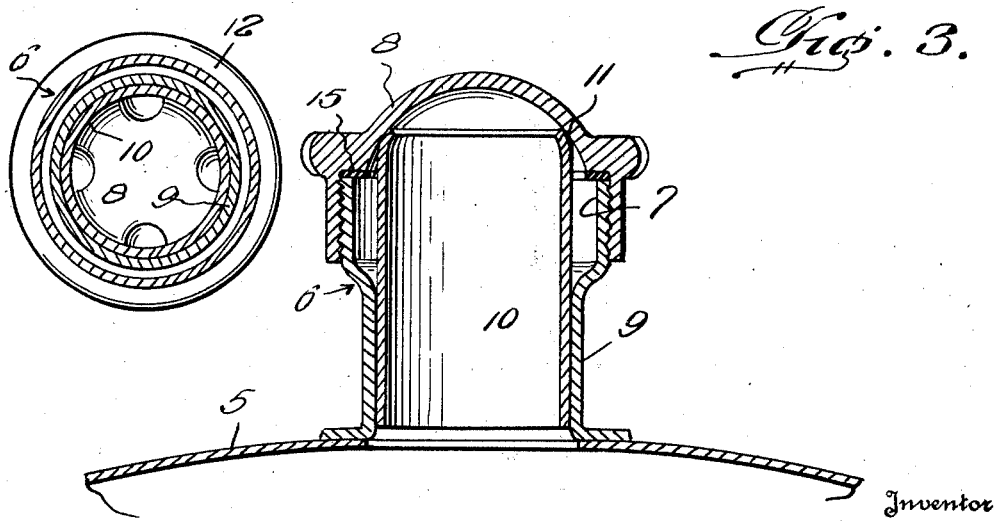
Inventor
W. D. Collier,
By J. Stanley Burch
Attorney Patented May 14, 1929.

1,712,551

UNITED STATES PATENT OFFICE.

WILLIAM D. COLLIER, OF FORT MYERS, FLORIDA.

RECEPTACLE CLOSURE.

Application filed March 19, 1928. Serial No. 262,764.

This invention relates to closures for metallic receptacles and has particular reference to an improved closure for the filler pipe or neck of automobile radiators, gasoline and oil tanks, or the like.

It is well known that the filler pipe and closure cap of conventional automobile radiators, gasoline tanks and the like are provided with threads which are shallow, narrow, and of a fine pitch, thus making it an extremely difficult matter to screw the cap onto or into the filler pipe or neck without crossing of the threads of the cap and filler pipe or neck.

The primary object of the present invention, therefore, is to provide means which is readily applicable to the filler pipe and closure cap of conventional automobile radiators, gasoline tanks and the like, for insuring against crossing of the threads of the cap and filler pipe when the cap is being screwed onto or into the filler pipe.

A more specific object is to provide guiding means on the filler pipe and closure cap which will register with one another when placing the cap in position for screwing onto the filler pipe, so that the cap and filler pipe will be axially alined with one another and the treads of the cap will match up properly with the threads of the filler pipe in order that the cap may be readily screwed into place without injuring the threads of either member by crossing of the threads.

Still another object is to provide guiding means of the above kind which is simple in character and capable of ready application to the filler pipe and closure cap of conventional automobile radiators, gasoline tanks and the like already in use.

The invention consists in the novel form, combination and arrangement of parts hereinafter more fully described, shown in the accompanying drawing and claimed.

In the drawing:

Figure 1 is a central vertical section of a radiator filler pipe closure provided with guiding means in accordance with the present invention.

Figure 2 is a horizontal section on line 2—2 of Figure 1; and

Figure 3 is a view similar to Figure 1 of a modified form of the invention.

Referring more in detail to the drawing, 5 indicates a conventional form of automobile radiator, gasoline tank, or the like provided with a top filler pipe or neck 6 having an enlarged upper or inlet end portion 7 which is of cylindrical form and threaded for reception of the closure cap 8.

In accordance with the present invention, the filler pipe or neck 6 is provided with a portion 9 below the inlet end portion 7 having a smooth cylindrical axial bore for snug sliding reception of the smooth cylindrical lower end portion of a guide tube 10 which is disposed axially of the cap member 8 with its upper end disposed concentrically within the latter and rigidly fastened to the closure cap 8 by soldering, welding or the like as indicated at 11. The guide tube 10 projects a sufficient distance below the cap 8 to have its lower end enter the upper end portion of the filler pipe portion 9 when the cap 8 is placed in position for screwing onto or into the upper filler pipe portion 7, but prior to actual initial engagement of the threads of the cap with the threads of the filler pipe. This engagement of the tube 10 with the filler pipe portion 9 will positively effect axial alinement of the threaded portion of the cap with the threaded portion of the filler pipe, thereby effectively insuring that the threads of the cap will match up properly with the threads of the filler pipe so that the cap may be readily screwed into place without injuring the threads of either member by crossing of the threads.

In the construction shown in Figures 1 and 2, the closure cap 8 has its lower end portion externally threaded, and the filler pipe portion 7 is internally threaded to receive the cap. Moreover, in this form of the invention, the filler pipe 6 is of tapered form, and the enlargement of the portion 7 provides a horizontal annular shoulder at the lower end of the latter as at 12 against which the packing ring or gasket 13 may seat for insuring that the closure will be water-tight. This packing ring or gasket is fitted onto the tube 10 against the lower end of the cap 8 so that it will be firmly clamped between the lower end of the cap and the shoulder 12 when the cap is screwed into place. Still further, the cylindrical portion of the filler pipe in this form of the invention is constituted by a second cylindrical guide tube fitted in the lower portion of the filler pipe 6 and having an external annular flange 14 at its upper end seated on the shoulder 12 beneath the gasket 13 and permanently fastened to said shoulder by soldering, welding or the like.

In the form of the invention shown in Figure 3 the upper end portion 7 of the filler pipe is externally threaded to receive the internally threaded rim of the cap 8, a sealing gasket being interposed between the top wall of the cap 8 and the upper end of the filler pipe portion 7, as at 15, to insure a water-tight closure. The form of the invention shown in Figure 3 further embodies the direct provision of the pipe 6 with a cylindrical lower end portion 9 so that a second separate guide tube for cooperation with the guide tube 10 is not required.

From the above description it will be seen that I have provided a simple and efficient means for application to a conventional closure cap and filler pipe, whereby the cap and filler pipe may be quickly axially alined so that the cap may be readily screwed into place without injuring the threads of either member by crossing of the threads.

Minor changes may be made without departing from the spirit and scope of the invention as claimed.

What I claim as new is:

In a closure for a metallic receptacle, the combinaiton with the filler pipe of the receptacle having a lower portion provided with a smooth cylindrical bore and an upper end portion provided with screw-threads, of a closure cap having a flange provided with screw-threads adapted to engage the screw-threads of the filler pipe, and a guide tube having its upper end rigidly secured to and disposed axially of and within said closure cap, said guide tube projecting below the bottom of the cap and having a smooth cylindrical lower end portion adapted to rotatably and slidably fit in the bore of said lower portion of the filler pipe to axially aline the cap with the filler pipe and insure matching of the threads of the cap with those of the pipe when the cap is applied to said pipe, the upper end portion of said filler pipe being internally threaded and enlarged to provide an internal annular shoulder at the lower end of said upper end portion of said filler pipe, the flange of the closure cap being externally threaded to be screwed into said upper end portion of the filler pipe, and a second cylindrical guide tube forming said lower portion of the filler pipe and having an external annular flange on its upper end seated and rigidly secured on said internal annular shoulder.

In testimony whereof I affix my signature.

WILLIAM D. COLLIER.